INVENTORS
GRANT M. RANDALL
STANLEY M. KERBER
DEAN B. ANDERSON

ATTORNEY

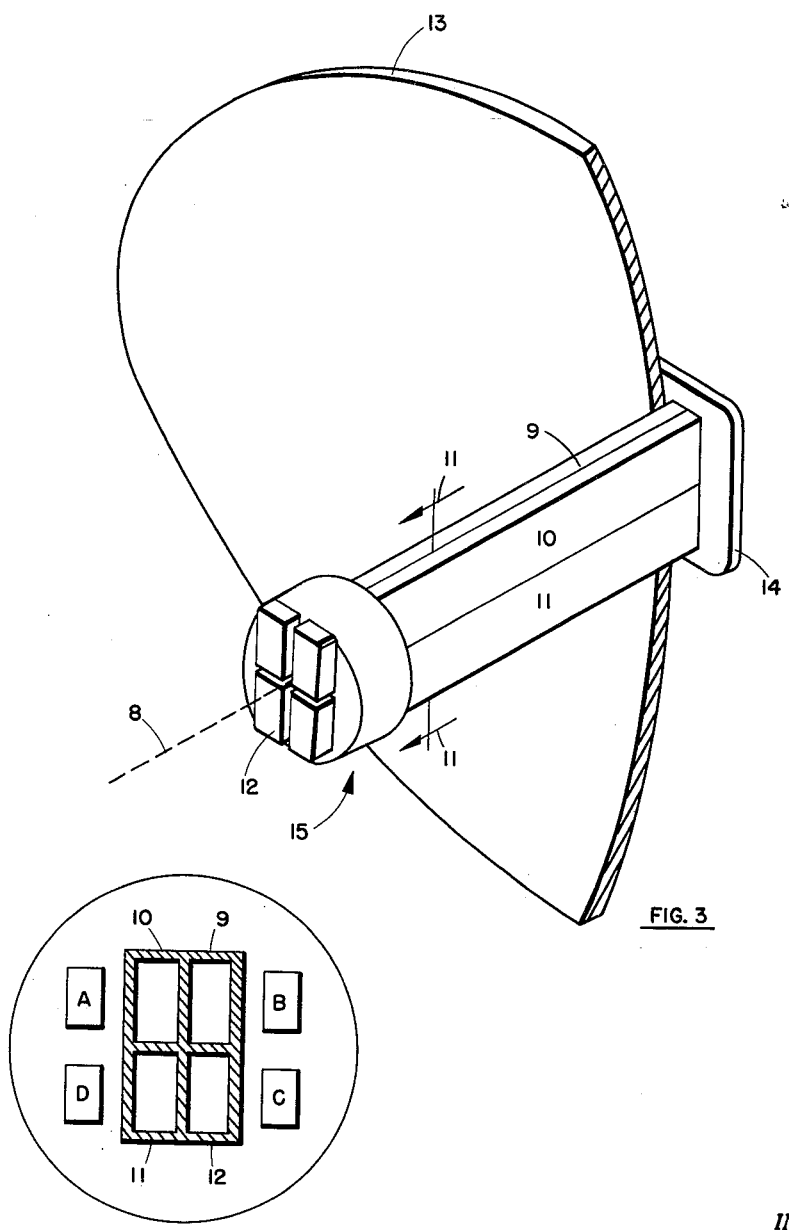

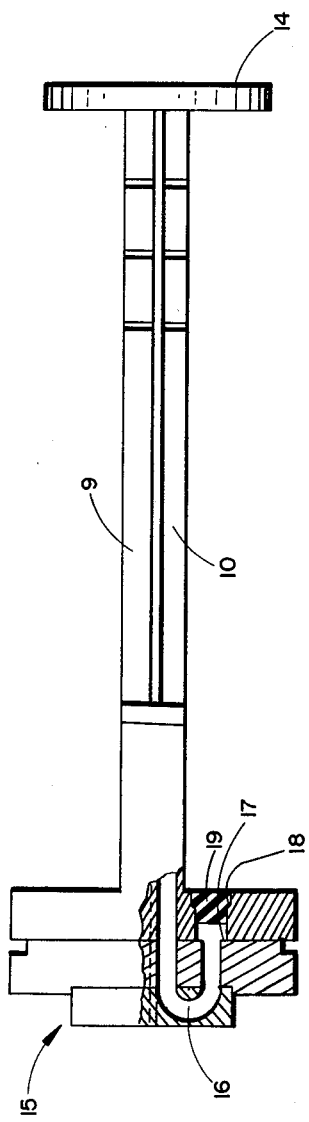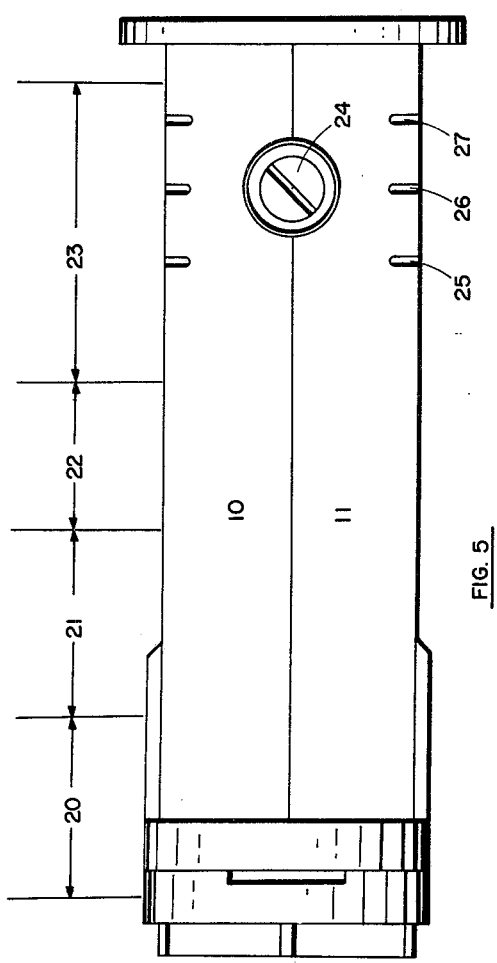

Jan. 1, 1963 G. M. RANDALL ETAL 3,071,769
FOUR HORN FEED BRIDGE
Filed Jan. 16, 1958 10 Sheets-Sheet 4

*INVENTORS*
GRANT M. RANDALL
STANLEY M. KERBER
DEAN B. ANDERSON

Lewis L. Humphries
ATTORNEY

Jan. 1, 1963  G. M. RANDALL ETAL  3,071,769
FOUR HORN FEED BRIDGE
Filed Jan. 16, 1958  10 Sheets-Sheet 5

INVENTORS
GRANT M. RANDALL
STANLEY M. KERBER
DEAN B. ANDERSON

ATTORNEY

RANGE (ON AXIS)

ERROR IN ELEVATION

ERROR IN AZIMUTH

United States Patent Office 3,071,769
Patented Jan. 1, 1963

3,071,769
FOUR HORN FEED BRIDGE
Grant M. Randall and Dean B. Anderson, Whittier, and Stanley M. Kerber, Fullerton, Calif., assignors to North American Aviation, Inc.
Filed Jan. 16, 1958, Ser. No. 709,729
36 Claims. (Cl. 343—778)

This invention relates to a four horn feed system and more specifically relates to a four channel antenna feed bridge for a monopulse radar system which provides signals indicating range, azimuth error and elevation error information.

In order to achieve a high degree of precision in the locating and tracking of targets by pulse radar, accurate determination of both range and bearing is required. The errors involved in determining range are inherently low so that the problem is primarily one of accurate angle determination. Numerous methods are available to increase the accuracy with which a radar can determine bearing angles. Such methods include the use of antennas whose radiation patterns simulate a fine pencil beam, form sequential lobes, conically scan, or form simultaneous lobes. Simultaneous lobing is the most versatile method, and it is most independent of random fluctuations of return signals. The monopulse or simultaneous lobing system, as the name implies, provides complete range and bearing error information in each return pulse.

Simultaneous lobing in two planes, azimuth and elevation, is achieved in this invention by the use of four channels having apertures, together with an associated microwave structure that simultaneously provides the vector sum and difference of the signals received through the apertures. While some methods of monopulse operation are based on comparison of signal amplitudes, and others are based on phase comparison, the device of the invention utilizes both amplitude and phase comparison methods of simultaneous lobing. The antenna has a range channel pattern and an error pattern. The range channel pattern consists of a principal lobe with a maximum on the antenna axis. The error pattern is a hollow conical lobe with the hollow directed along the axis.

A novel feature of this invention is that it is adapted to center feed an antenna. That is, it feeds through the center of a reflector and does not require microwave structure which extends around the edge of the reflector from behind to a position in front of the reflector. It also does not require lens structure to obtain desired radiation patterns. Center feed is a more compact arrangement and in the particular invention herein leaves space immediately behind the reflector unoccupied by the usual microwave bridge structure. All of the bridgework in this invention lies forward of the antenna reflector without any deterioration of the radiation patterns.

Previously a two horn feed bridge was used as one method of solving the problem of obtaining accurate radar bearing information. Such a system results in shorter radar range, lower range channel gain, asymmetrical radiation patterns and large H plane beam width of sum or range channel radiation pattern for a given reflector size.

The four horn feed bridge of the device of the invention is an improvement in the radiation and reception characteristics of this antenna. It is further improved by reason of its simplicity, its compactness, symmetrical radiation pattern, increased range channel gain, ready adaptability to various size reflectors without redesign and smaller H plane range channel beam. By suitable scaling of the feed bridge dimensions, this bridge can be used in various frequency bands. Various shape reflectors may be used in conjunction with the feed bridge of the invention merely by changing the location and dimensions of the apertures or by changing the overall length of the feed bridge.

It is therefore an object of this invention to provide an improved antenna feed system.

A second object of this invention is to provide a compact, center feed, bridge system.

It is a further object of this invention to provide a four horn antenna feed bridge of smaller size and simpler construction.

Another object of this invention is to provide a feed bridge capable of being located forward of the antenna reflector.

It is still another object of this invention to provide a four horn antenna feed system capable of ready adaptability to various size antenna reflectors.

It is another object of this invention to provide a compact antenna feed bridge which can be located substantially between the feed apertures and the vertex of a reflector.

It is a still further object of this invention to provide a four horn antenna feed system providing increased angle resolution.

Still another object of this invention is to provide a four horn antenna feed system for a radar system having increased range channel gain.

Further objects of this invention will become apparent from the following description taken in connection with the accompanying drawings, in which FIG. 1 represents a cross-section of the error channel pattern;

FIGURE 2b represents the cross-section of each radiation pattern of two nonadjacent antenna apertures located in another plane, such as, for example, the azimuth plane, which is orthogonal to the plane of FIG. 2a;

FIG. 3 is an isometric of the four horn feed bridge system including a reflector shown partially cut away;

FIG. 4 is a partially cut away top view of the feed bridge showing the turn-around in one channel;

FIG. 5 is a side view of the four horn feed showing the sections in which are contained the various phase shifters and couplers;

FIG. 11 is a section taken on line 11 in FIG. 3;

The antenna feed bridge of this invention consists of four microwave channels whose horns, or radiating apertures, are located near the focal point of a reflector. In actual practice, these apertures may be closed by some low loss dielectric material, but, nevertheless they are apertures to microwave radiation. The channels provide central feed, that is, they extend through the center of the reflector to a position in front thereof, whereupon they turn around and illuminate the reflector by their apertures. The signals in each of the channels are phase shifted relative to each other and are combined with the signals in the other channels by radio frequency bridges located within the four channels. This is accomplished by using various types of waveguide structures such as Δ (differential) phase shifters, top wall couplers and side slot couplers in proper relationship to provide the necessary radiation patterns.

Figure 1:
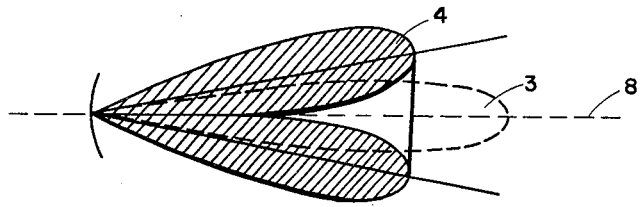

In order for the feed bridge to provide range signal transmission and reception, it is necessary that upon excitation of the bridge each of the four apertures transmit in phase, that is, the signals be transmitted from the apertures in phase, with equal amplitude, resulting in the radiation pattern shown by lobe 3 in FIG. 1.

Referring now to the drawings, FIG. 1 illustrates the error pattern of the antenna which may be seen to be a hollow cone 4 having its hollow portions directed along the boresight axis plane. Lobe 3 is the radiation pattern of the sum signal, or range signal.

Figure 2A:
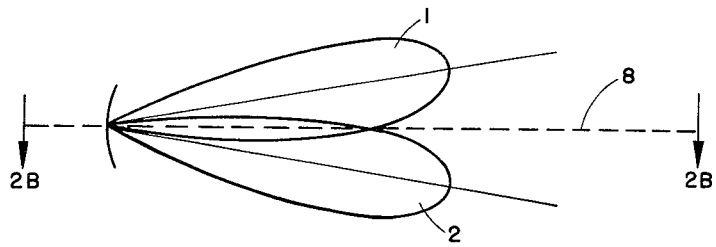
FIG. 2a represents the cross-section of each radiation pattern of two adjacent antenna apertures located in one plane such as the elevation plane.
Figure 2B:
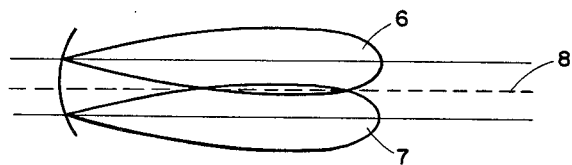

FIG. 2a illustrates the patterns of the individual apertures of the antenna in a plane such as the elevation plane. FIG. 2b illustrates the pattern of the apertures of the antenna in a plane orthogonal to the plane of FIG. 2a, such as the azimuth plane. It is noted that the axes of the lobes 6 and 7 in FIG. 2b are parallel, but that in FIG. 2a the axes of the lobes 1 and 2 diverge. Divergence or parallelism of axes may be obtained, for example, by adjustment of aperture location or reflector shape as is well-known to those skilled in the art.

Figure 12:
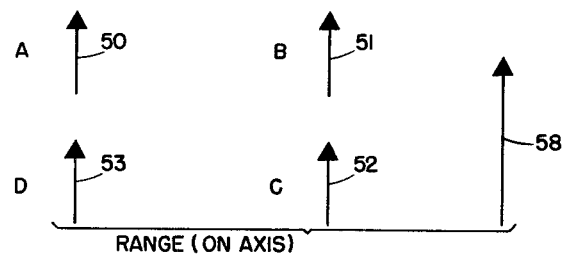
FIGS. 12, 13 and 14 are vector diagrams showing resolution of the signals which exist under certain circumstances in apertures A, B, C and D of FIG. 11.

Referring to FIG. 12, a returned range signal from a target on the antenna boresight axis will excite equal amplitude, equal phase components 50, 51, 52 and 53 in the apertures A, B, C and D. Referring momentarily to FIG. 1 which shows the range channel radiation lobe 3, we see a single range lobe is produced in transmission by the sum of the apertures, then by reciprocity, the signals returned to the four channels by this on axis target will all end up as signal 58, FIG. 12, in the range channel output of the feed bridge, to be sent to the receiver.

Figure 13:
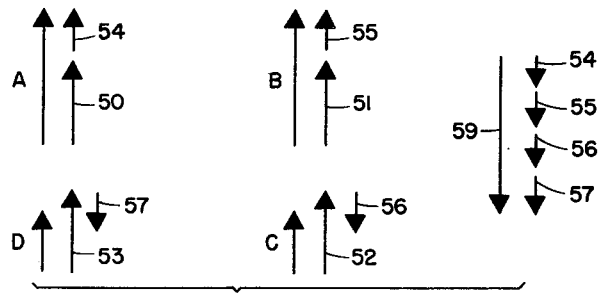

For deviations from the boresight axis in the plane of apertures A and D (which may be, in a particular embodiment, the elevation plane), signals of unequal amplitude, FIG. 13, are excited in apertures A with respect to D, and apertures B with respect to C. There also exists a slight phase difference between the signals received in apertures A with respect to D, and B with respect to C, but this effect is of negligible magnitude because the separation of the phase centers of the apertures A and D, also B and C is small. These unequal amplitude signals illustrated in FIG. 13 can be each resolved into 2 components. The first component is the equal amplitude, in phase signals 50, 51, 52 and 53 in each of the apertures which are comparable to the signals of FIG. 12 and which end up in the range channel output of the feed bridge going to the receiver. The second components 54, 55, 56 and 57 are equal amplitude signals in all channels and components 54 and 55 in channels A and B are in phase, and components 56 and 57 in channels C and D are in phase, but are 180° out of phase with the components 54 and 55 in channels A and B. The magnitude of these out-of-phase signals is proportional to the angle of deviation in elevation from the boresight axis. It may be appreciated then, to get the elevation error signal we shift the signals represented by 54 and 55 into phase with the signals represented by 56 and 57 to obtain a signal represented by 59. The direction of deviation (up or down) is determined by the phase of the signal 59 relative to the phase of the range channel signal 58, FIG. 12; it being in phase, for example, if the error in elevation is above the boresight axis and out of phase, for example, if the error in elevation is below the boresight axis as shown in FIG. 13. The fact that the arrow 59 points down illustrates that the elevation error signal is out of phase with the range channel signal 58 and thus, the target is below the boresight axis.

It may be understood that in a particular application the feed bridge may be modified or may be turned on its side and the corresponding plane previously spoken of as elevation becomes an azimuth plane. Therefore, this invention is not limited to practicing this invention in the particular planes herein illustrated and it is understood that the operation in the azimuth and elevation planes or other planes may be readily obtained.

Figure 14:
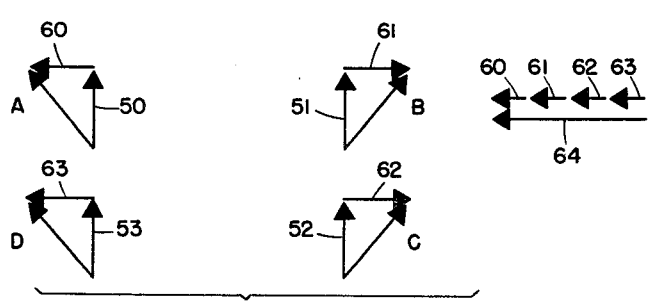

For deviation in the plane intersecting apertures A and B, FIG. 14 which may, for example, be termed the azimuth plane, signals of essentially equal amplitude, but different phase, are excited in apertures A with respect to B and C with respect to D. This occurs, in the embodiment illustrated, by reason of the fact that the left half of the reflector is somewhat "shadowed" from the apertures of channels 10 and 11 and the right half of the reflector is somewhat "shadowed" from the apertures of channels 9 and 12. The signals off-axis in azimuth thus excite out-of-phase components in channels 10 and 11 with respect to channels 9 and 12; or, in other words, the "phase centers" of the apertures of channels 9 and 12 are effectively displaced from the "phase centers" of the apertures of channels 10 and 11. Such phase center displacement may be accomplished by reason of the physical location of the apertures or construction of the reflector or both. The illustration of FIG. 3 utilizes both. However, the phase of the signals in apertures A and D are equal as are their amplitudes and the phase of the signals in apertures B and C are equal as are their amplitudes. The signal in each channel may be resolved, again, into two components, a component of each channel being equal in amplitude and phase (components 50, 51, 52 and 53 which components end up in the range channel output going to the receiver), and the remaining components. These components are represented by vectors 60, 61, 62 and 63. It is noted that components 60 and 63 are in phase with each other and of equal amplitude, while the other components 61 and 62 are also in phase with each other and of equal amplitude, but are 180° out of phase with respect to components 60 and 61. Therefore, to obtain azimuth error signal, the components 61 and 62 are shifted in time phase 180° relative to components 60 and 63 and then are added thereto to provide an azimuth error signal 64 which indicates by its magnitude the azimuth error angle. Also, by its relative phase with respect to the range channel signal, it indicates whether the target is to the left or right of the boresight axis.

The four channel feed bridge system is the microwave structure which functions to provide the necessary resolution into the component signals illustrated in FIGS. 12, 13 and 14. Referring again to FIG. 3, there are four microwave channels 9, 10, 11 and 12. The reflector 13 is shown partially cut away. A flange 14 mounts the feed bridge to reflector 13. The four channels terminate in a feed turn-around 15 which reflects radiation patterns against the reflector in transmission and receives radiation from the reflector in reception. The feed turn-around may be more clearly understood by reference to FIG. 4 which shows the feed turn-around 16 of channel 10. The steps 17 and 18 provide a microwave transformer and Teflon insert 19 allows a reduction of center to center distance between apertures beyond that obtainable with open apertures and, thus, provide a minimum of phase difference in the signals received by these apertures. It is noted that in a central feed then, two apertures lie on each side of the channels. Referring to FIG. 11, apertures A and D are adjacent on one side of channels 9, 10, 11 and 12 and B and C are adjacent on the other side of the channels. Such location provides a certain amount of isolation between apertures A and B which are nonadjacent and between apertures C and D which also are nonadjacent. The isolation is to improve the characteristics of the antenna in the plane in which phase comparison is used, in this illustration, the azimuth plane.

FIG. 5 is a side view of the feed bridge and shows the location of various structural elements and adjustments.

It can be seen that the construction is compact and relatively uncomplicated viewed from the outside. There is included in section 20 of two of the channels a Δ 90° phase shifter. The symbol "Δ" representing a relative shift of phase of the signal as compared with the phase shift of the signal in a channel with no protrusions or structures. In section 21 are top wall couplers. In section 22 are further Δ90° phase shifters and section 23 includes side slot couplers. A tuning button is shown at 24, there being one on each side of the feed bridge for tuning the side slot couplers. The inserts such as 25, 26 and 27 are inductive irises inserted into the channel walls at the location of the side slot coupler, these irises being small metal blanks which extend into the channels.

Figure 6:
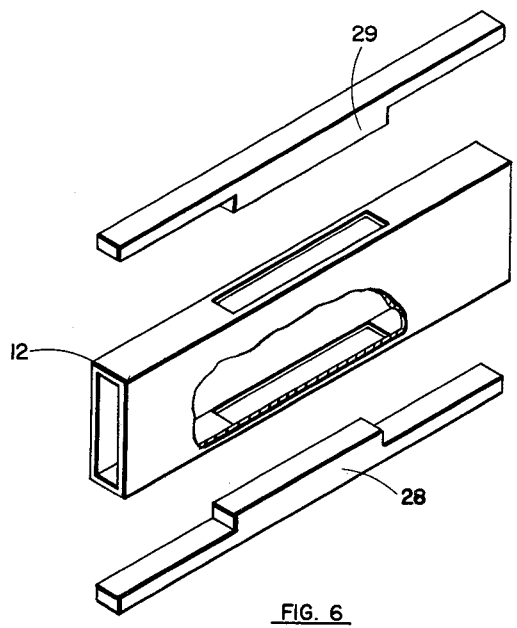
FIG. 6 is an exploded view of a +90° phase shifter.

FIG. 6 illustrates a Δ +90° phase shifter in a waveguide. For example, in channel 12 in section 20, and in channel 10 in section 22, there are Δ +90° phase shifters such as that shown in FIG. 6. The metallic protrusions 28 and 29 extend into the channel 9 and provide a Δ +90° phase shift. Proper design for such a phase shifter at given frequencies is well-known to those skilled in the microwave art.

Figure 7:
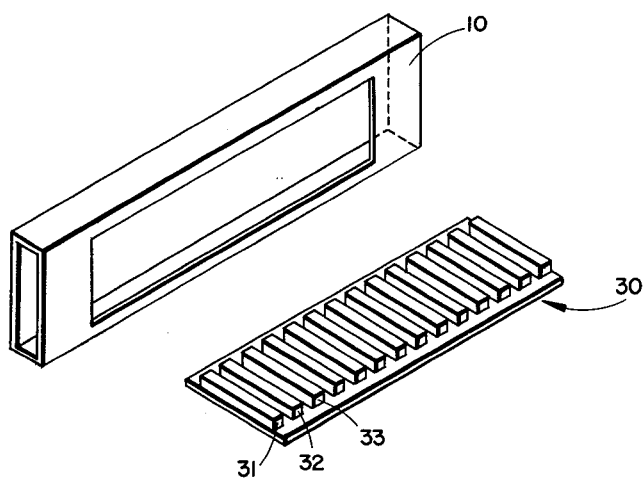
FIG. 7 is an exploded view of a —90° phase shifter.

FIG. 7 is an exploded view of a Δ −90° phase shifter such as is contained in channel 10 in section 20 and in channel 11 in section 22, of FIG. 5. Plate 30 having a series of raised longitudinal metallic rectangles such as 31, 32 and 33 fits into place in the side wall of the channel and provides a Δ −90° phase shift of the signals therein.

Figure 8:
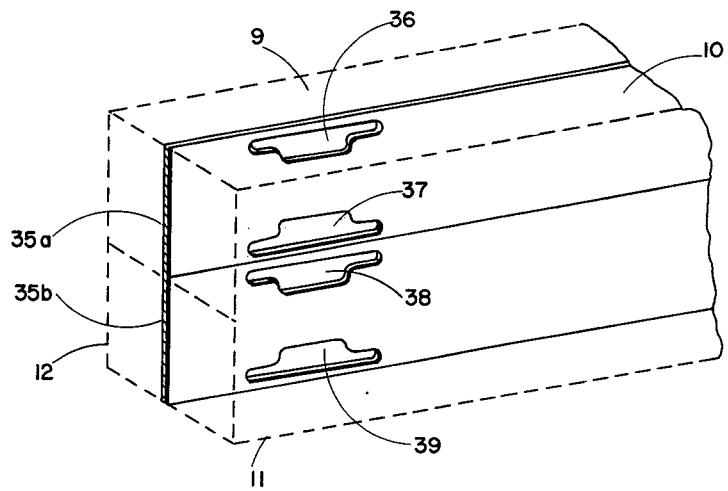
FIG. 8 illustrates two top wall couplers in the septa between two pairs of adjacent channels.
Figure 9:
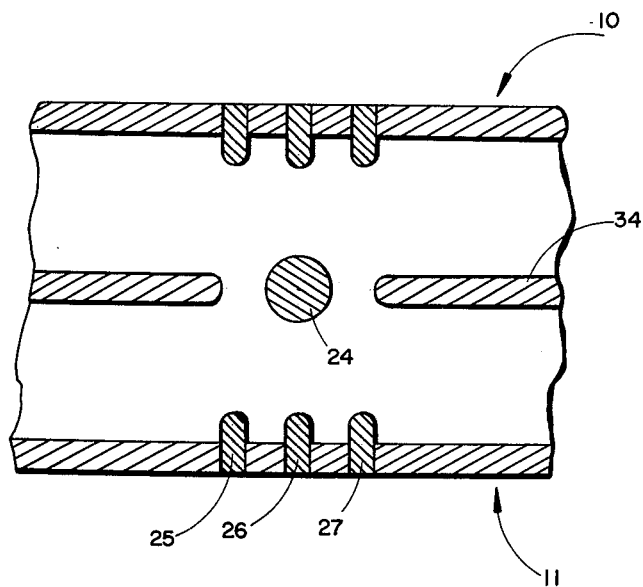
FIG. 9 illustrates a cross-section of a side slot coupler in the septum between two channels.

FIG. 8 illustrates top wall couplers in the septa 35a and 35b between channels 9 and 10, and 11 and 12 within the section 21 illustrated in FIG. 5. Openings 36 and 37 perform top wall coupling between channels 9 and 10. Openings 38 and 39 perform top wall coupling between channels 11 and 12. FIG. 9 shows the side slot coupler between channels 10 and 11 located in section 23 as shown in FIG. 5. There is, of course, a similar side slot coupler between channels 9 and 12. Inductive irises, such as 25, 26 and 27 can be seen to extend into the channels. The septum 34 dividing the channels can be seen to be interrupted and tuning button 24 extends into this area for tuning purposes. The tuning button may be replaced with a fixed button or structure being nonadjustable. In FIG. 9, tuning button 24 is adjusted by external rotation as may be seen by reference to FIG. 5.

Thus far has been described all of the essential elements for carrying out the invention. Referring to the phase diagram of FIG. 10, the various channels 9, 10, 11 and 12 are indicated. There can be seen to be in channel 10 and in channel 12 a Δ 90° phase shifters in each, one being minus, the other being plus. These phase shifters are located in the section 20 shown in FIG. 5. Subsequently, there is top wall coupling between channels 9 and 10, and also between channels 11 and 12 in section 21. Such top wall coupling provides a phase shift of +45° in the energy transferred from channel 10 to channel 9 and provides a shift of −45° in the energy originally in channel 9 and continuing in such channel. It is to be noted therefore, upon combination in channel 9, the coupler causes a relative phase shift of energy between channels 9 and 10 of 90°. Subsequently, in section 22 there are further Δ 90° phase shifters in channels 10 and 11. Subsequently, in section 23 there is a side slot coupler between channels 10 and 11 and a side slot coupler between channels 9 and 12. Such side slot coupling provides a phase shift of −135° in the energy transferred from channel 11 into channel 10 and from channel 12 into channel 9. It further provides a shift of −45° of the energy originally in channel 10 and continuing in such channel and a shift of −45° in the energy channel 9 and continuing in such channel. It is to be noted that the side slot coupler, therefore, causes a relative phase shift of 90° between signals which it combines. In the top wall couplers and side slot couplers illustrated in in FIG. 10, with the phase shift being as illustrated, provided by such couplers, power is then equally split between channels. That is, when the energy in each channel reaches a side slot coupler or a top wall coupler, half of it is transferred to the adjacent channel and half of it remains in the original channel.

Other types of phase shifters and couplers which may readily be substituted are known to those skilled in the art. However, the ones shown are preferred by reason of their ready adaptability and the fact that they fit easily into the structure shown in FIG. 5.

Figure 10:
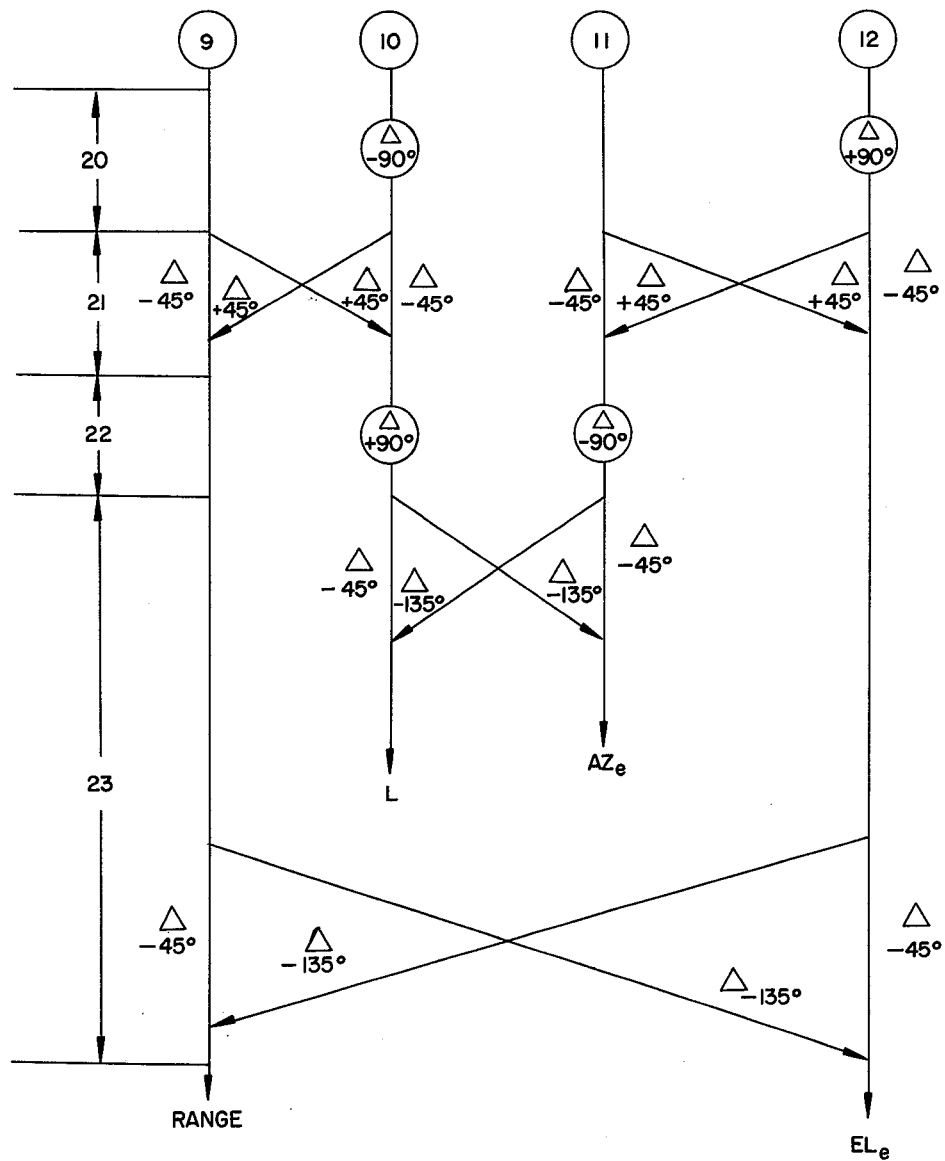
FIG. 10 is a phase shift diagram showing the phase shifters and couplers in the various channels.

Theoretical analyses of the error channel signals, azimuth and elevation, provided according to FIG. 10, indicates that these signals are in quadrature relationship at the time of leaving section 23 in FIG. 5, and may therefore be combined in a single error channel while still in microwave form. This is termed "monoquad" by those skilled in the art. This eliminates, of course, any requirement for an extra mixer and an extra transmit-receive tube, and requires only a single preamplifier and an intermediate amplifier for the simultaneous handling of both the azimuth and the elevation error channel signals. A quadrature video detector, commonly known in the art, can be used after I.-F. amplification to separate these two error signals.

Figure 15:
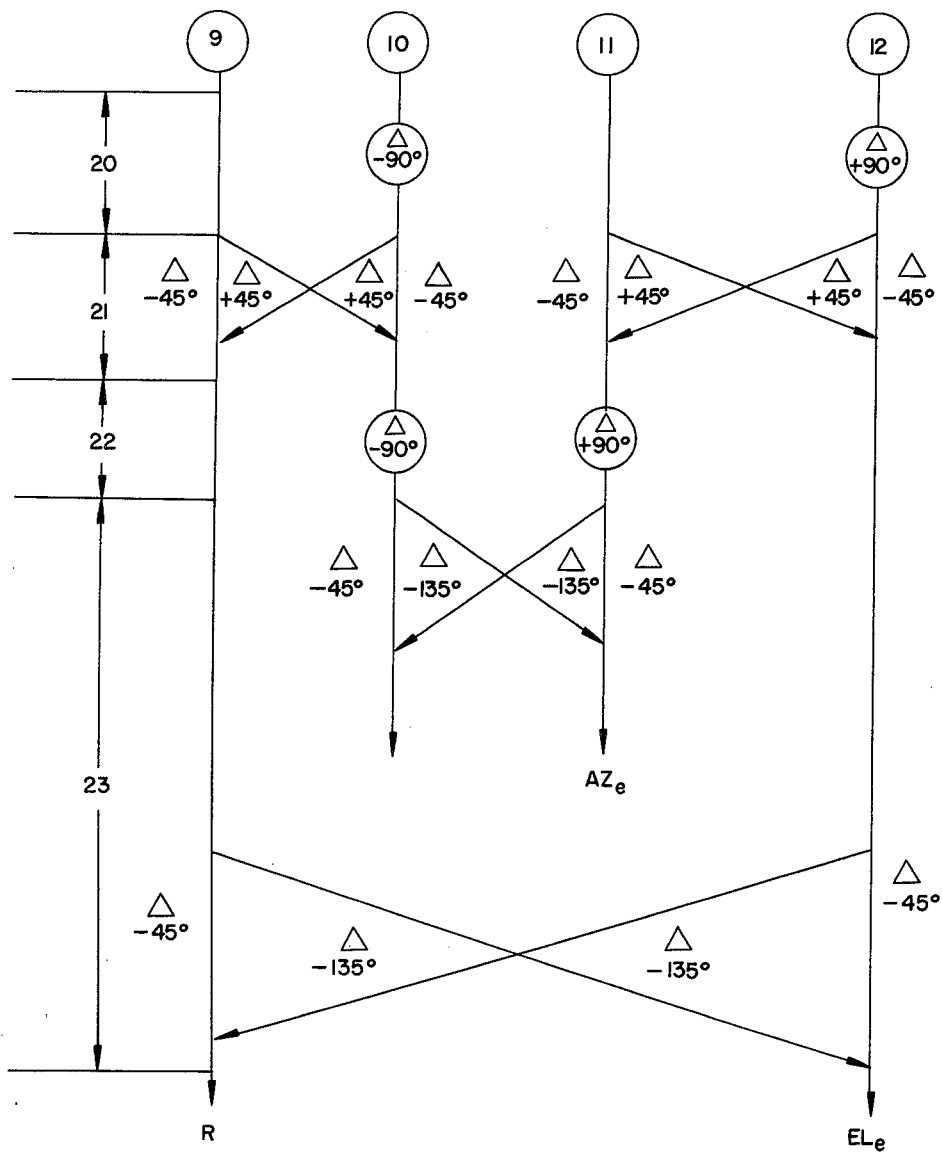
FIG. 15 is another phase shift diagram of another embodiment showing the phase shifters in alternative arrangement.
Figure 16:
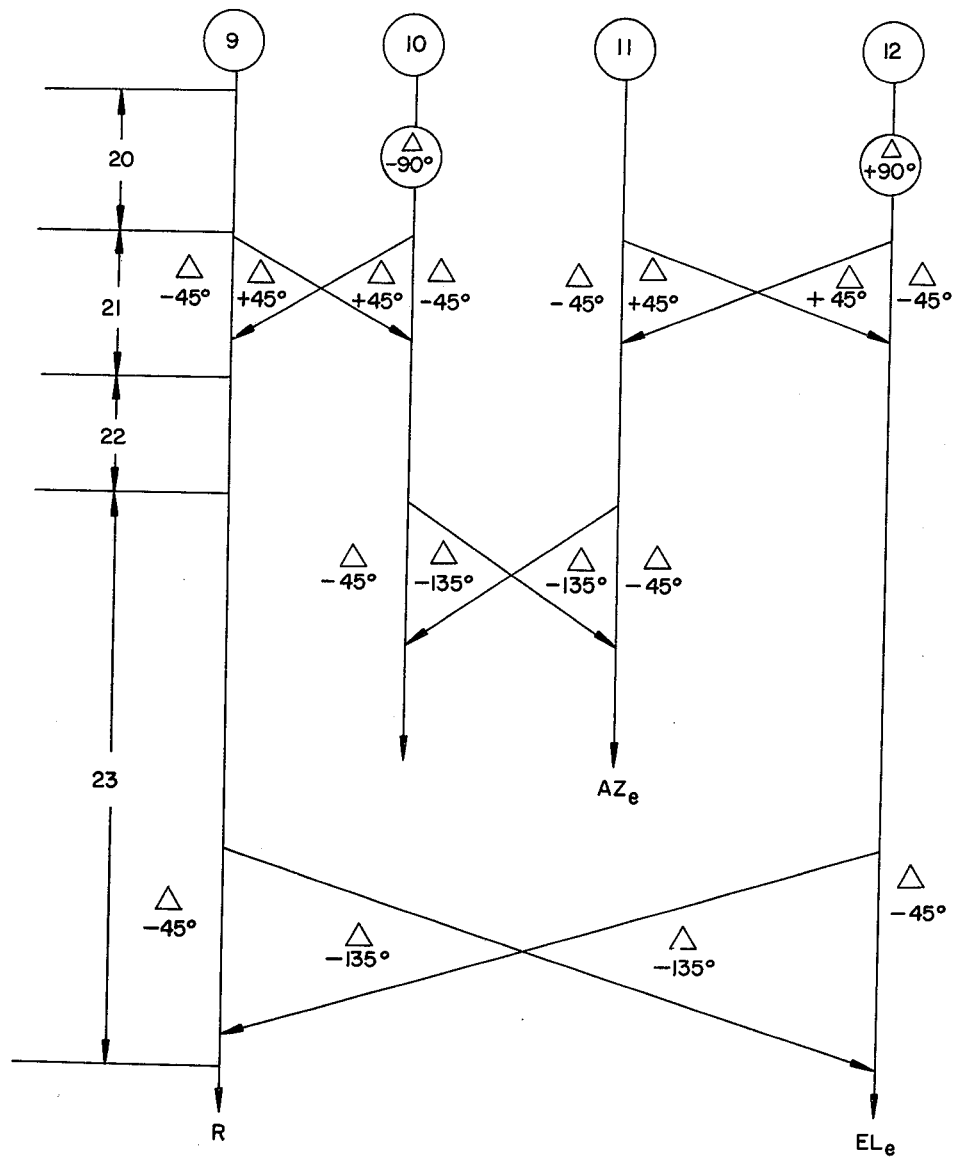
FIG. 16 is a third phase shift diagram of the phase shifters in alternative arrangement; and, FIG. 17 is a fourth phase shift diagram of an alternative embodiment.
Figure 17:
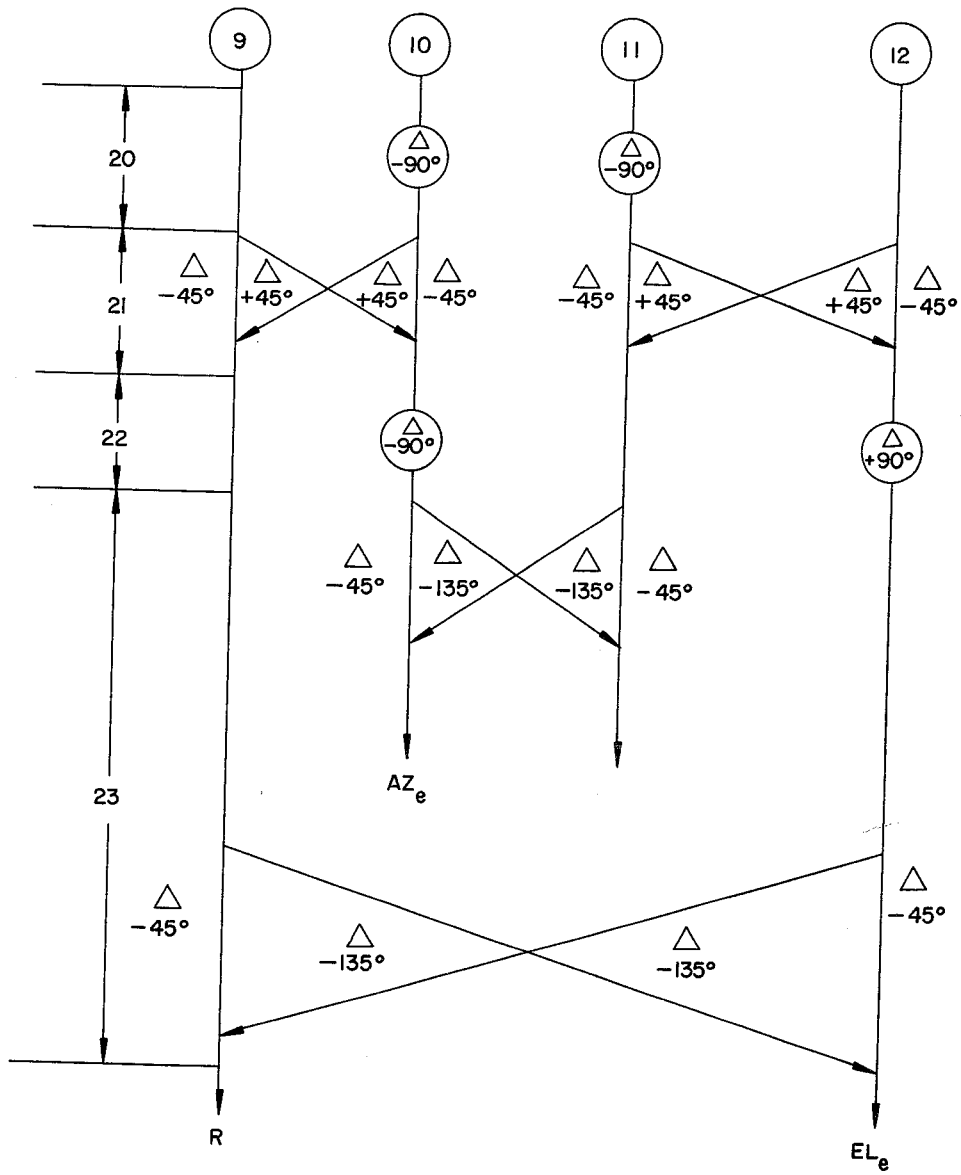

FIGS. 15, 16, and 17 show modification of the phase shift diagram of the preferred embodiment illustrated by FIG. 10. It may be appreciated that different locations and arrangements of phase shifters may be utilized to obtain the compact, simplified construction illustrated in FIGS. 4 and 5. In FIG. 15, the signs of two Δ 90° phase shifters in channels 10 and 11 are changed from those shown in FIG. 10. In FIG. 15, the azimuth error signal in channel 11 still remains in time quadrature with the signal in channel 12. In FIG. 16, two of the Δ 90° phase shifters are not utilized in channels 10 and 11. The azimuth error signal in channel 11, however, is not in time quadrature with the signal in elevation channel 12. It is, of course, possible to maintain the signals separate and not place them in time quadrature, or to place them in time quadrature by subsequent structure. FIG. 17 utilizes a different arrangement of phase shifters and the azimuth error signal ends up in channel 10. The embodiment of FIG. 10 is preferred by reason of the fact that the azimuth and elevation error signals are in time quadrature and therefore, may be detected by a single detector, and further, by the fact that the range channel 9 and the dead end channel 10 are side by side (see FIG. 3) and the range channel can be physically widened out at its transmitter end for coupling to the transmitter. Dead end channel 10 may thus be terminated in its characteristic impedance or, in an impedance which is non-reflective, as is commonly known by those skilled in the art. FIG. 10 illustrates that such channel may be terminated in a dissipative load.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination, an antenna feed system, four channels each having an aperture, the phase center of a first aperture being disposed with substantially no displacement with respect to the phase center of a second aperture and the phase center of said first aperture being disposed with substantial displacement from the phase center of said remaining apertures, two of said channels being, for at least a portion of their length, adjacent to each other and parallel and adjacent to the remaining two of said channels, means for summing the in phase components of the radiation received in said apertures providing a signal indicating range and means for providing signals indicating the difference in amplitude between signals received by a first aperture and a second aperture, said means for providing and said means for summing, being disposed within the parallel portion of said channels.

2. The combination recited in claim 1 wherein is included means for providing signals indicating the difference in phase between signals received by a first and said fourth apertures.

3. The combination recited in claim 1 wherein is included means for providing signals indicating the amplitude difference between signals received by a third and said fourth apertures, and means providing signals indicating the phase difference between signals received by said second and third apertures and means for summing said signals indicating amplitude difference, and means for summing said signals indicating phase difference.

4. In combination, four channels having apertures located near the focal point of a reflector, said apertures directed so as to transmit their maximum along substantially parallel axes in at least one plane, the phase centers of two of said channels being substantially displaced from the phase centers of the remaining two of said channels, two of said channels being, for at least a portion of their length, adjacent to each other and parallel and adjacent to the remaining two of said channels, means for summing the in phase components of radiation received in said apertures providing a signal indicating range, means for providing signals indicating the difference in phase between signals received by a first aperture and a second aperture and said means for providing and said means for suming, being disposed within the parallel portion of said channels.

5. In combination in an antenna feed system, four channels, two of said channels disposed in parallel and side by side with the remaining two channels, each of said channels having an aperture, said apertures disposed so as to provide radiation patterns having their maximum along substantially parallel axes in at least a first plane and radiation patterns having their maximum along diverging axes in a plane orthogonal to said first plane, means for summing the in phase components of radiation received in said apertures providing a signal indicating range, means for providing a signal indicating the difference in phase between signals received by a first aperture and a second aperture, means providing signals indicating the difference in phase between signals received by said first aperture and a fourth aperture and means for summing said signals indicating difference in phase, said means for providing and said means for summing disposed within said parallel portions of said channels.

6. The combination recited in claim 5 wherein said first and second apertures are disposed in a direction with respect to each other which is parallel to said first plane, and said third and fourth apertures are disposed in a direction with respect to each other which is parallel to said first plane.

7. In combination, a four channel antenna feed system, said channels being disposed in parallel relationship, and wherein each of said channels terminates in an aperture, two of said apertures disposed adjacent each other but non-adjacent the remaining two, wherein the adjacent apertures are disposed to provide radiation patterns whose axes diverge, and wherein the nonadjacent apertures are disposed to provide radiation patterns whose axes are parallel, the phase centers of said apertures with respect to non-adjacent apertures being substantially displaced, means for relatively phase shifting by 180° the signals received in two adjacent apertures with respect to the signals received in the remaining two adjacent apertures, and means for combining said signals, said means for phase shifting and said means for combining being disposed within the portion of said channels in parallel.

8. In combination, a four channel antenna feed system, two of said channels being disposed in side by side relationship with and parallel to the remaining two of said channels, and wherein each of said channels terminates in an aperture, each aperture of both pairs being adjacent each other, but each pair being non-adjacent the other pair, wherein the adjacent apertures are disposed to provide radiation patterns whose axes diverge, and wherein the nonadjacent apertures are disposed to provide radiation patterns whose axes are parallel, the phase centers of said apertures with respect to non-adjacent apertures being substantially displaced, means for relatively phase shifting by 180° the signals received in two nonadjacent apertures with respect to the signals received in the remaining two nonadjacent apertures, and means for combining said signals, said means for phase shifting and said means for combining disposed within the parallel portion of said channels.

9. In combination, a four channel antenna feed system wherein each of said channels terminates in a turn around and an aperture and wherein said apertures are disposed two on each side of said four channels wherein said adjacent apertures are disposed to provide radiation patterns whose axes diverge and wherein said nonadjacent apertures are disposed to provide radiation patterns whose axes are parallel, the phase centers of said nonadjacent apertures being relatively displaced, bridge means for relatively phase shifting by 180° the signals received in two adjacent apertures with respect to the signals received in the remaining two adjacent apertures, and means for combining said signals, means for relatively phase shifting by 180° the signals received in two nonadjacent apertures with respect to the signals received in the remaining two nonadjacent apertures, and means for combining said signals provided by said nonadjacent apertures, said bridge means and said means for combining disposed in adjacent walls of said four channels.

10. In combination, a four channel antenna feed system having a portion of said four channels extending in parallel, juxtaposed relationship, each of said channels having an aperture, said apertures disposed so that two are adjacent and the remaining two are also adjacent, and, further, the first two are nonadjacent the second two, said first two apertures disposed with respect to each other to obtain maximum radiation along diverging axes, said second two apertures being similarly disposed with respect to each other, said first two apertures having their phase centers substantially displaced from the said second two apertures, means for relatively shifting by 180° the time phase relationship of the radiant energy in a first channel with respect to a second channel, and means for relatively shifting by 180° the time phase relationship of the radiant energy in a third channel with respect to a fourth channel, means for obtaining equal time phase shift of radiant energy in said first channel and said fourth channel and means for obtaining equal time phase shift of the radiant energy in said second channel and radiant energy in said third channel, and means for combining said relatively time phase shifted radiant energy signals, said means for relatively shifting, said means for obtaining, and said means for combining disposed in the parallel, juxtaposed portions of said four channels.

11. The combination recited in claim 10 wherein said first and said second channels have adjacent apertures and said third and said fourth channels have adjacent apertures.

12. In a four channel feed bridge system, said channels having adjacent walls, each of said channels terminating in a turn-around and an aperture, said apertures disposed two on a side of said four channels, one of said apertures having substantially no phase displacement with respect to another of said apertures and having substantial phase displacement from the remaining two of said apertures, means providing the sum of the differences of signals in selected channels, and means providing the difference of the sums of signals in selected channels, said sum and difference means being located in the walls of said channels.

13. The combination recited in claim 12 wherein is included means for summing the signals in said channels, providing a signal indicating range.

14. In combination, a four channel antenna feed system, each of said channels terminating in a turn-around and an aperture, said apertures disposed two on a side of said four channels, said apertures on the same side having their phase centers with substantially no displacement with respect to each other and said apertures on opposite sides having their phase centers substantially displaced with respect to each other, means for combining the signals received in a first channel and a second channel, said signals being relatively phase shifted 180° with respect to each other, means for combining the signals received in a third channel and a fourth channel, said signals being relatively phase shifted by 180° with respect to each other, means for summing the combined signals of said first and second channels with the combined signals of said third and fourth channels, said means for combining and said means for summing being disposed in juxtaposed walls of said channels.

15. In combination, a four channel antenna feed system, two of said channels having walls adjacent to the walls of the remaining two of said channels, each channel terminating in a turn-around and an aperture, said apertures disposed two on a side of said four channels, said apertures disposed on the same side having substantially no phase displacement between their phase centers and said apertures disposed on opposite sides having substantial displacement between their phase centers, said apertures on one side of said four channels having their axes of radiation parallel to the axes of maximum radiation of the apertures on the opposite side of said four channels, means for combining the signals received in a first and fourth of said channels in equal time phase shift relationship and means for combining the signals received in the second and third of said horns in equal time phase shift relationship, and means for relatively shifting the phase of said combined first and fourth channel signals 180° in time relationship with respect to said combined second and third channel signals, and means for combining said relatively shifted signals, said means for combining disposed in adjacent walls of said channels.

16. In combination, a compact, four channel antenna feed system, each channel having an aperture, said four channels extending in parallel for at least a portion of their length, a first and fourth of said apertures directed for maximum radiation along substantially parallel axes with respect to the maximum radiation of the second and third of said apertures, said first and fourth apertures having their phase centers displaced from the phase centers of said second and third apertures, and said first and second apertures having their phase centers undisplaced from the phase centers of said third and fourth apertures, means for obtaining equal time phase shift of the radiant energy in said third and fourth channels and means for relatively shifting by 180° the time phase relationship of the radiant energy received in the first and the second channels with respect to the radiant energy received in said third and fourth channels, and means for combining said relatively phase shifted radiant energy signals, said means being disposed within the parallel portion of said channels.

17. In combination, a four channel antenna feed system each channel having an aperture, a first and fourth of said channels having walls adjacent said second and third channels, respectively, and said first and fourth of said apertures are designed to provide maximum radiation along substantially parallel axes with respect to the maximum radiation of the second and third of said apertures, said first and fourth apertures having their phase centers substantially displaced from the phase centers of said second and third apertures, means for obtaining equal time phase shift of the radiant energy in said first and fourth channels and means for relatively shifting by 180° the time phase relationship of the radiant energy received in the first and the fourth channels with respect to the radiant energy received in said second and third channels, and means for combining said relatively phase shifted radiant energy signals, and wherein further said first and second of said apertures are disposed to provide maximum radiation along substantially diverging axes with respect to the third and fourth apertures, said first and second apertures having their phase centers without substantial displacement from the phase centers of said third and fourth apertures, means for obtaining equal time phase shift of radiant energy in said third and fourth channels and means for relatively shifting by 180° the time phase relationship of the radiant energy received in the first and second channels with respect to the radiant energy received in said third and fourth channels, and means for combining said relatively phase shifted radiant energy signals, said means for combining disposed within adjacent walls of said channels.

18. In a four channel antenna feed system, said four channels having apertures, a first and fourth of said apertures having displaced phase centers and directed to radiate along parallel axes with respect to a second and third of said apertures, and said first and second of said apertures having undisplaced phase centers and directed to radiate along diverging axes with respect to said third and fourth apertures, said channels comprising a first channel, a range channel, an azimuth channel, and an elevation channel, means for combining the signals received in the first of said channels with the signals received in the range channel, said signals being relatively shifted 180° with respect to each other, said azimuth channel and said elevation channel having an adjacent wall, means disposed within said adjacent wall for combining the signals received in the azimuth channel with the signals received in the elevation channel, said signals being relatively shifted 180° with respect to each other, said first and said range channels each having an adjacent wall with one of said azimuth and said elevation channels, means for summing the combined signals of said first and range channels with the combined signals of the said azimuth and elevation channels, and means for combining the signals received in the first and range channels in equal time phase shift relationship and means for combining the signals received in the azimuth and elevation channels in equal time phase shift relationship and means for combining said combined equal time phase-shifted signals of said first and said range channels with said combined equal phase shifted signals of said azimuth and elevation channels, in 180° phase relationship.

19. The combination recited in claim 18 wherein is further included means for obtaining equal time phase relationship of the radiant energy in all of said channels and means for combining said signals in equal time phase shifted relationship.

20. In a four channel feed system, each channel having an aperture, wherein a first and fourth of said channels have apertures having a substantial phase displacement from a second and third of said apertures said first and fourth apertures directed so as to radiate along parallel axes with respect to said second and third apertures, and said first and second apertures having no phase displacement from said third and fourth apertures, said first and second apertures directed to radiate along diverging axes with respect to said third and fourth apertures, a first position in the first of said four channels for shifting the phase of the radiant energy in said channel —45°, means at a second position in said first channel for shifting the phase of the radiant energy signal an additional —45°, means at a first position in a second of said channels for shifting the phase of the radiant energy −90°, means at a second position in said second channel for shifting the phase −45°, means at a third position in said second channel for shifting the phase +90°, means at a first position in the third of said channels for shifting the phase −45°, means at a second position in said third channel for shifting the phase −90°, means at a third position in said third channel for shifting the phase −45°, means at a first position in said fourth channel for shifting the phase +90°, means at a second position in said fourth channel for shifting the phase −45°, means at a third position in said fourth channel for shifting the phase −45°, means subsequent to the first position in said second channel for shifting the signal +45° and coupling it to said first channel subsequent to the first position in said first channel, means for shifting the signal +45° received in said first channel, and coupling it to said second channel subsequent to said second position, means for shifting by +45° the signal received in said third channel and coupling it to said fourth channel subsequent to said second position in said fourth channel, means for phase shifting by +45° the signal subsequent to said first position in said fourth channel, and coupling it subsequent to said first position in said third channel, means for shifting by −135° the signal in said second channel subsequent to said third position in said second channel and coupling it to said third channel subsequent to said third position in said third channel, means for phase shifting by −135° the signal in said fourth channel subsequent to said second position and supplying it to said first channel subsequent to said second position, and means for phase shifting by −135° the signal in said first channel subsequent to the first position of said first channel and supplying it to said fourth channel subsequent to said third position in said fourth channel.

21. In a four channel antenna feed system, wherein each of said channels has an aperture, the first and fourth of said apertures directed to radiate along parallel axes with respect to the second and third of said apertures, and said first and second of said apertures directed to radiate along diverging axes with respect to said third and fourth apertures, a −90° phase shifter disposed in the second of said channels, a +90° phase shifter disposed in the fourth of said channels, a top wall coupler disposed between said first and second of said channels subsequent to the phase shifter in said second channel, a top wall coupler disposed between the third and fourth of the said channels subsequent to the phase shifter in said fourth channel, a +90° phase shifter disposed in said second channel subsequent to said top wall coupler, a −90° phase shifter disposed in said third channel subsequent to said top wall coupler, a side slot coupler disposed between said second and third channel subsequent to said phase shifters, and a side slot coupler disposed between said first and fourth channels subsequent to said top wall couplers.

22. In combination, a four channel antenna feed system wherein each of said channels has an aperture, the first and fourth of said apertures directed to radiate along parallel axes with respect to the second and third of said apertures, and said first and second of said apertures directed to radiate along diverging axes with respect to said third and fourth apertures, said system comprising a negative 90° phase shifter disposed in one of said first and second channels, a +90° phase shifter disposed in one of said third and fourth channels, a top wall coupler disposed between said first and second channels and a top wall coupler disposed between said third and fourth channels, a +90° phase shifter disposed in said one of said first and second channels in which said −90° phase shifter is disposed, a −90° phase shifter disposed in said one of said third and fourth channels in which said +90° phase shifter is disposed, a side slot coupler disposed between said second and third channels and a side slot coupler disposed between said first and fourth channels.

23. In a four channel feed bridge, wherein each of said channels has an aperture, the first and fourth of said apertures directed to radiate along parallel axes with respect to the second and third of said apertures, and said first and second of said apertures directed to radiate along diverging axes with respect to said third and fourth apertures, comprising a first channel, a range channel, an azimuth channel and an elevation channel, means for combining the signals in said four channels in equal time phase shifted relationship with respect to each other, providing a signal indicating range, means for combining the signals in a first pair of said channels in 180° time phase shifted relationship with respect to each other, means for combining the signals in a second pair of said channels in 180° time phase shifted relationship with respect to each other, one of said pairs comprising said azimuth channel and said elevation channel means for combining the output of said previously mentioned combining means wherein the signals of one of said first pair of channels is equally shifted in time phase relationship relative to the signals of one of said second pair of channels, said channels extending in parallel relationship throughout the length of said bridge.

24. The combination recited in claim 23 wherein is also included means for combining the signals in said first pair of channels in equal time phase shifted relationship with respect to each other, and means for combining the signals in said second pair of channels in equal time phase shifted relationship with respect to each other, and means for combining the output of said latter two means in 180° time phase shifted relationship with respect to each other.

25. In combination, an antenna feed bridge comprising a first channel, a range channel, an azimuth channel, and an elevation channel, said channels being parallel and juxtaposed throughout the length of said bridge, means for combining the signals in said first channel with the signals in said range channel, means for combining the signals in said azimuth channel with signals in said elevation channel, and means for determining the difference between said combined signals.

26. The combination recited in claim 25 wherein said means for determining the difference between said combined signals comprises means for phase shifting by 180° said combined signals of said azimuth and elevation channels with respect to said combined signals of said first and said range channels and means for combining said phase shifted signals.

27. The combination recited in claim 25 wherein said means for determining the difference between said combined signals comprises means for phase shifting by 180° said signals of said elevation channel with respect to signals of said azimuth channel and means for phase shifting by 180° the signals of said range channel with respect to signals of said first channel.

28. The combination recited in claim 25 wherein said means for determining the difference between said combined signals comprises means for relatively phase shifting signals of said range channel 180° with respect to the signals in said first channel, and means for relatively phase shifting said signals of said elevation channel 180° with respect to signals in said azimuth channel, and means for combining said relatively phase shifted signals.

29. The combination recited in claim 25 wherein said means for determining the difference between said combined signals comprises means for determining the difference between one said combined signals and the other said combined signals and further comprises means for determining the difference between one of said signals and the other signal with which it is combined.

30. A four channel antenna feed bridge comprising a first channel, a range channel, an azimuth channel and an elevation channel, said channels having apertures, said range and said first channels having apertures directed to radiate along diverging axes with respect to said azimuth and said elevation channels, and said range and said elevation channel apertures directed to radiate along parallel axes with respect to said first and said azimuth channels, said azimuth and elevation channels disposed adjacent and parallel to each other throughout the length of said bridge and said azimuth and elevation channels being disposed adjacent said first and said range channels, coupling means displosed between each of said adjacent channels.

31. The combination recited in claim 30 wherein said coupling means comprises two top wall couplers and two side slot couplers, said top wall couplers being disposed between said range and said first channels and said azimuth and said elevation channels and said side slot couplers being disposed between said azimuth and said first channel and said elevation and said range channel.

32. A four channel antenna feed bridge comprising a first channel, a range channel, an azimuth channel and an elevation channel, said azimuth and elevation channels disposed adjacent and parallel to each other throughout the length of said bridge, and said azimuth and elevation channels being disposed adjacent said first and said range channels, means including coupling means for combining signals in said azimuth channel and said elevation channel with substantially no relative phase shift with respect to each other.

33. The combination recited in claim 32 wherein is further included means including coupling means for combining signals in said azimuth channel and said elevation channel with substantially 180° phase shift with respect to each other.

34. The combination recited in claim 32 wherein is included means including coupling means for combining said first channel and said range channel signals with substantially no relative phase shift with respect to each other, further means including coupling means for combining said first channel and said range channel signals with said combined azimuth and elevation channel signals with a relative phase shift of 180° with respect to each other, further means including coupling means for combining the signals in said first channel and said range channel with substantially 180° phase shift with respect to each other, and further means including coupling means for combining signals in said azimuth channel and said elevation channel with substantially 180° phase shift with respect to each other, and means for combining the signals provided by said latter two means.

35. A four channel antenna feed bridge comprising a first channel, a range channel, an azimuth channel extending in juxtaposed, parallel relationship through the length of said bridge, and an elevation channel, coupling means, said coupling means disposed between said azimuth and elevation channels, said first and said range channels, said first and said azimuth channels, and said range and said elevation channels.

36. The combination recited in claim 35 wherein is included delay means disposed with respect to said coupling means so as to provide a phase shift of 180° of signals of two of said coupled channels with respect to the remaining two of the channels.

References Cited in the file of this patent

UNITED STATES PATENTS 2,585,173    Riblet _____ Feb. 12, 1952
2,830,288    Dicke _____ Apr. 8, 1958

OTHER REFERENCES

Aeronautical Engineering Review, May 1952, pp. 71–73.